(12) United States Patent
Iizuka (10) Patent No.: US 7,649,157 B2
(45) Date of Patent: Jan. 19, 2010

(54) CHUCK TABLE FOR USE IN A LASER BEAM PROCESSING MACHINE

(75) Inventor: Kentaro Iizuka, Tokyo (JP)

(73) Assignee: Disco Corporation, Tokyo (JP)

( * ) Notice: Subject to any disclaimer, the term of this patent is extended or adjusted under 35 U.S.C. 154(b) by 31 days.

(21) Appl. No.: 11/078,621

(22) Filed: Mar. 14, 2005

(65) Prior Publication Data
US 2005/0205531 A1    Sep. 22, 2005

(30) Foreign Application Priority Data
Mar. 17, 2004    (JP) .............................. 2004-076064

(51) Int. Cl.
*B23K 26/02* (2006.01)
(52) U.S. Cl. .............................. 219/121.82; 219/121.6; 219/121.58
(58) Field of Classification Search ............ 219/121.82, 219/121.6, 121.58
See application file for complete search history.

(56) References Cited

U.S. PATENT DOCUMENTS

| | | | |
|---|---|---|---|
| 4,558,225 A * | 12/1985 | Gotou et al. ............. | 250/491.1 |
| 5,366,906 A * | 11/1994 | Wojnarowski et al. ........ | 438/17 |
| 5,527,744 A * | 6/1996 | Mignardi et al. ................ | 216/2 |
| 5,534,073 A * | 7/1996 | Kinoshita et al. ............ | 118/728 |
| 5,809,987 A * | 9/1998 | Wark et al. ..................... | 125/35 |
| 5,825,043 A * | 10/1998 | Suwa .......................... | 250/548 |
| 5,953,590 A * | 9/1999 | Piper et al. ................... | 438/113 |
| 6,261,370 B1 * | 7/2001 | Otsuki et al. ................. | 118/500 |
| 6,687,113 B2 * | 2/2004 | Saito et al. ................... | 361/234 |
| 6,740,853 B1 * | 5/2004 | Johnson et al. .......... | 219/444.1 |
| 6,806,544 B2 * | 10/2004 | Liu .............................. | 257/414 |
| 6,998,571 B2 * | 2/2006 | Sekiya et al. .......... | 219/121.67 |

FOREIGN PATENT DOCUMENTS

| JP | 51-82658 | 12/1974 |
|---|---|---|
| JP | 2000126959 | 5/2000 |
| JP | 3408805 | 3/2003 |
| JP | 2003-320466 | 11/2003 |
| JP | 2004-58380 | 2/2004 |

* cited by examiner

*Primary Examiner*—M. Alexandra Elve
(74) *Attorney, Agent, or Firm*—Smith, Gambrell & Russell, LLP (57) ABSTRACT

A chuck table for use in a laser beam processing machine, having a workpiece holding area for holding a workpiece, wherein the workpiece holding area is similar in shape to the workpiece and smaller in size than the workpiece, and a buffer groove is formed in such a manner that it surrounds the workpiece holding area.

3 Claims, 7 Drawing Sheets

CHUCK TABLE FOR USE IN A LASER BEAM PROCESSING MACHINE

FIELD OF THE INVENTION

The present invention relates to a chuck table for holding a workpiece in a laser beam processing machine.

DESCRIPTION OF THE PRIOR ART

In the production process of a semiconductor device, a plurality of areas are sectioned by dividing lines called "streets" arranged in a lattice pattern on the front surface of a substantially disk-like semiconductor wafer and a circuit such as IC or LSI is formed in each of the areas sectioned. Individual semiconductor chips are manufactured by cutting this semiconductor wafer along the dividing lines to divide it into the areas having a circuit formed thereon. An optical device wafer comprising gallium nitride-based compound semiconductors laminated on the front surface of a sapphire substrate is also cut along dividing lines to be divided into individual optical devices such as light emitting diodes or laser diodes which are widely used in electric equipment.

Cutting along the dividing lines of the above semiconductor wafer or optical device wafer is generally carried out by using a cutting machine called "dicer". This cutting machine has a chuck table for holding a workpiece such as a semiconductor wafer or optical device wafer, a cutting means for cutting the workpiece held on the chuck table, and a cutting-feed means for moving the chuck table and the cutting means relative to each other. The cutting means has a spindle unit, which comprises a rotary spindle, a cutting blade mounted on the spindle and a drive mechanism for rotary-driving the rotary spindle. The cutting blade comprises a disk-like base and an annular cutting edge which is mounted on the side wall outer peripheral portion of the base and formed as thick as about 20 μm by fixing diamond abrasive grains having a diameter of about 3 μm to the base by electroforming.

Since a sapphire substrate, silicon carbide substrate, etc. have high Mohs hardness, cutting with the above cutting blade is not always easy. Further, as the cutting blade has a thickness of about 20 μm, the dividing lines for sectioning devices must have a width of about 50 μm. Therefore, in the case of a device measuring 300 μm×300 μm, the area ratio of the streets to the wafer becomes 14%, thereby reducing productivity.

As a means of dividing a plate-like workpiece such as a semiconductor wafer or the like, a laser beam processing method for applying a pulse laser beam capable of passing through the workpiece with its focusing point set to the inside of the area to be divided is also attempted nowadays. In the dividing method making use of this laser beam processing technique, the workpiece is divided by applying a pulse laser beam of an infrared range capable of passing through the workpiece from one side of the workpiece with its focusing point set to the inside to continuously form a deteriorated layer along the dividing lines in the inside of the workpiece and exerting external force along the dividing lines whose strength has been reduced by the formation of the deteriorated layers. This method is disclosed by Japanese Patent No. 3408805.

To improve the throughput of a circuit such as IC or LSI, a semiconductor wafer having a low-dielectric insulating film (Low-k film) made of an inorganic material such as SiOF or BSG (SiOB) or an organic material such as a polymer exemplified by polyimide or parylene on the front surface of a semiconductor substrate such as a silicon wafer has recently been implemented. Since the Low-k film consists of multiple layers (5 to 15 layers) and is extremely fragile like mica, however, a problem arises in that when the above semiconductor wafer having a Low-k film is cut along the dividing lines with a cutting blade, the Low-k film peels off, and this peeling reaches the circuits and gives a fatal damage to the semiconductor chips.

To solve the above problem, JP-A 2003-320466 discloses a processing machine for removing the Low-k film by applying a laser beam to the Low-k film formed on the dividing lines of the semiconductor wafer to remove the Low-k film and cutting the semiconductor wafer from which the Low-k film has been removed with a cutting blade, along the dividing lines.

To process the semiconductor wafer by a laser beam, a chuck table and laser beam application means are moved relative to each other in the cutting-feed direction while a laser beam is applied to the semiconductor wafer held on the chuck table from the laser beam application means. When a laser beam is applied beyond the periphery of the semiconductor wafer, however, a problem involves that it is applied to the chuck table holding the semiconductor wafer and damages the workpiece holding area of the chuck table, thereby reducing the surface accuracy. Further, to divide the semiconductor wafer along the dividing lines, a laser beam is applied along the dividing lines in a state where the semiconductor wafer is put on a dicing tape and hence, when a laser beam overruns the semiconductor wafer as described above, the dicing tape is molten by heating and adheres to the workpiece holding area of the chuck table. Vacuum suction holes formed in the workpiece holding area of the chuck table may be blocked with this dicing tape, and the surface accuracy of the workpiece holding area may lower. Therefore, the dicing tape adhering to the workpiece holding area must be scraped off with a grindstone or the chuck table must be exchanged according to circumstances.

To solve the above problem, the applicant of the present invention proposes as Japanese Patent Application No. 2004-58380 a laser beam processing machine which detects a start point coordinate value and an end point coordinate value of a dividing line formed on the workpiece held on the chuck table, stores them in a storage means and applies a laser beam from the start point to the end point stored in the storage means.

Since the coordinate values of the processing area of the workpiece held on the workpiece holding area of the chuck table must be detected for each dividing line, the technology proposed as Japanese Patent Application No. 2004-58380 is not satisfactory in terms of productivity.

SUMMARY OF THE INVENTION

It is an object of the present invention to provide a chuck table for use in a laser beam processing machine, which is free from the damage of its workpiece holding area for holding a workpiece even when a laser beam that is applied to the workpiece overruns the workpiece.

According to the present invention, the above object of the present invention is attained by a chuck table for use in a laser beam processing machine, having a workpiece holding area for holding a workpiece, wherein the workpiece holding area is similar in shape to the workpiece and smaller in size than the workpiece, and a laser beam buffer groove is formed in such a manner that it surrounds the workpiece holding area.

Preferably, a laser beam absorbing member is disposed at the bottom of the laser beam buffer groove.

Since the workpiece holding area of the chuck table of the present invention is similar in shape to the workpiece and smaller in size than the workpiece and a laser beam buffer groove is formed in such a manner that it surrounds the workpiece, even when a laser beam overruns the workpiece, it is applied not to the workpiece holding area but to the laser beam buffer groove, thereby making it possible to prevent the damage of the workpiece holding area. Further, even when the laser beam is applied to the above laser beam buffer groove, the bottom of the groove is fully far from the focusing point of the laser beam and the laser beam diffuses and hence, the energy density is not high enough to process the laser beam buffer groove and the chuck table does not undergo damage. When the workpiece is put on a dicing tape, if the above overrun occurs, a laser beam will be applied to the dicing tape and the dicing tape will be molten by heating. However, as the workpiece holding area of the chuck table is not existent in the area where the laser beam is applied to the dicing tape, the molten dicing tape will not adhere to the workpiece holding area. Consequently, the maintenance of the chuck table is not necessary, thereby making it possible to cut the running cost.

DETAILED DESCRIPTION OF THE PREFERRED EMBODIMENTS

Preferred embodiments of the present invention will be described in detail hereinunder with reference to the accompanying drawings.

Figure 1:
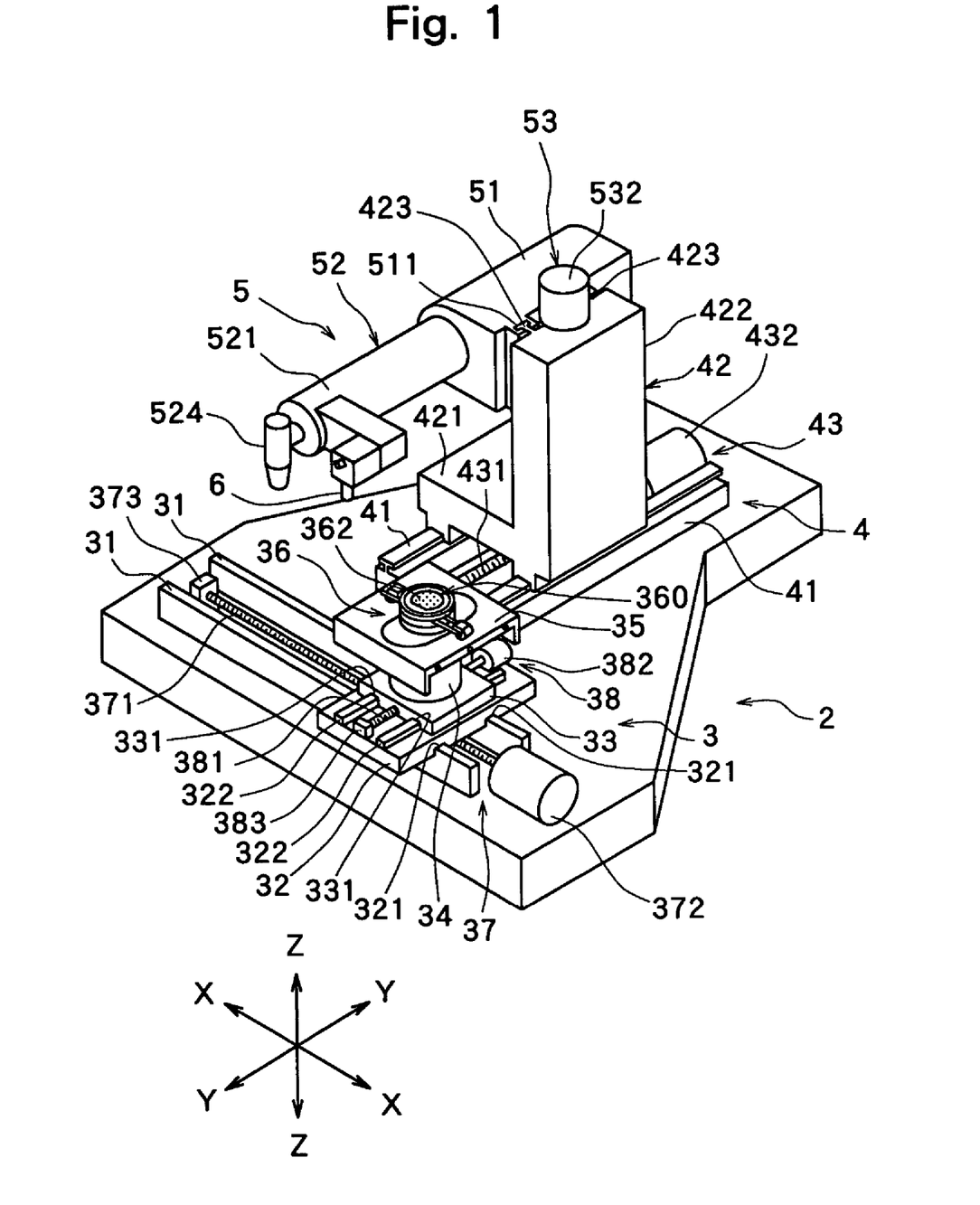
FIG. 1 is a perspective view of a laser beam processing machine equipped with a chuck table constituted according to the present invention.

FIG. 1 is a perspective view of a laser beam processing machine constituted according to the present invention. The laser beam processing machine shown in FIG. 1 comprises a stationary base 2, a chuck table mechanism 3 for holding a workpiece, which is mounted on the stationary base 2 in such a manner that it can move in a processing-feed direction indicated by an arrow X, a laser beam application unit support mechanism 4 mounted on the stationary base 2 in such a manner that it can move in an indexing-feed direction indicated by an arrow Y perpendicular to the direction indicated by the arrow X, and a laser beam application unit 5 mounted on the laser beam application unit support mechanism 4 in such a manner that it can move in a direction indicated by an arrow Z.

Figure 2:
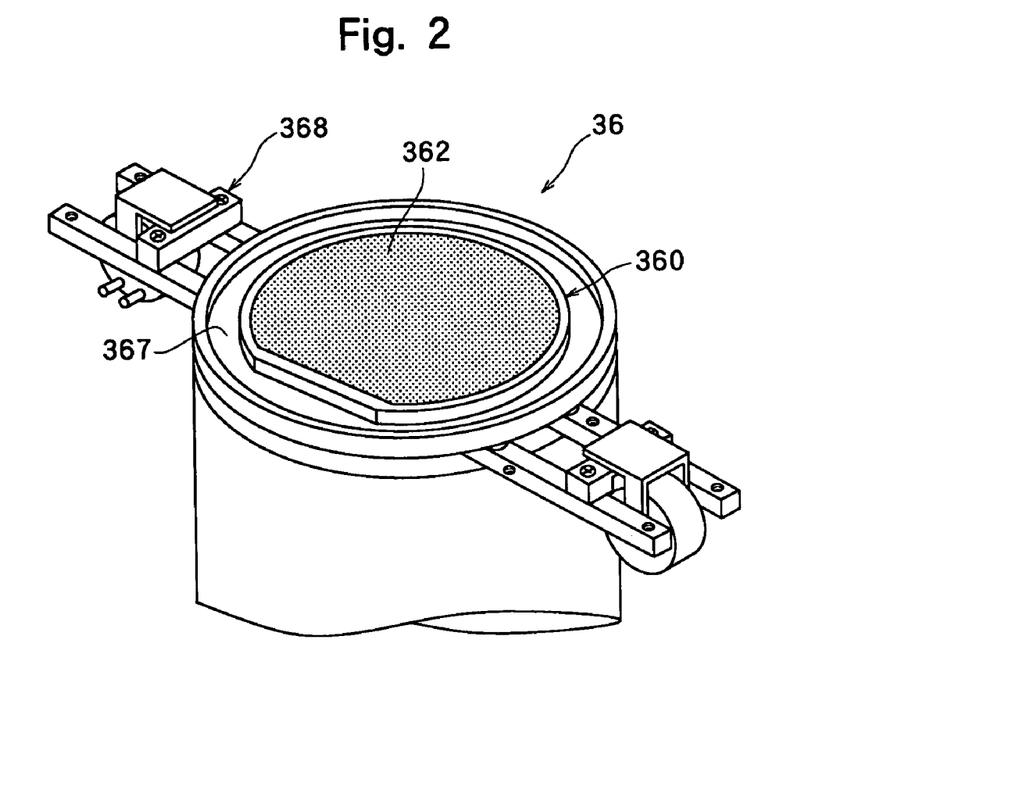
FIG. 2 is a perspective view of the principal section of the chuck table constituted according to the present invention.
Figure 3:
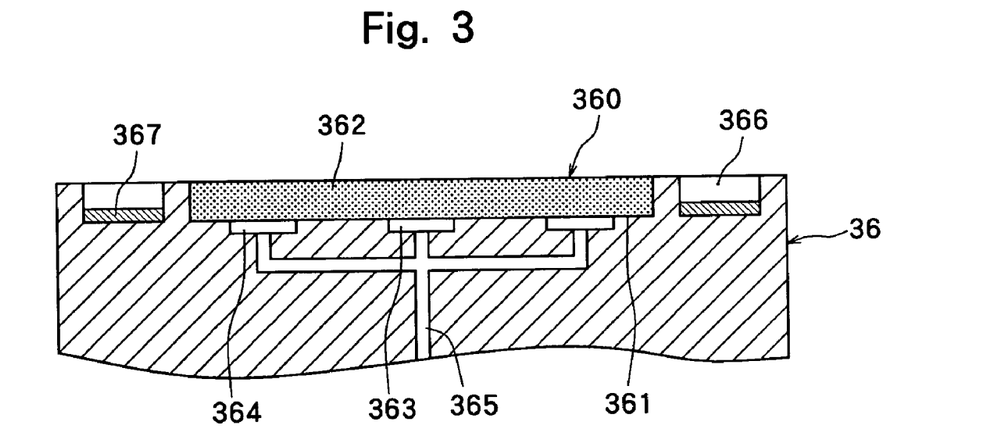
FIG. 3 is a sectional view of the chuck table shown in FIG. 2.

The above chuck table mechanism 3 comprises a pair of guide rails 31 and 31 that are mounted on the stationary base 2 and arranged parallel to each other along the processing-feed direction indicated by the arrow X, a first sliding block 32 mounted on the guide rails 31 and 31 in such a manner that it can move in the processing-feed direction indicated by the arrow X, a second sliding block 33 mounted on the first sliding block 32 in such a manner that it can move in the indexing-feed direction indicated by the arrow Y, a support table 35 supported on the second sliding block 33 by a cylindrical member 34, and a chuck table 36 as a workpiece holding means. This chuck table 36 is made of a metal material such as stainless steel or the like and has a workpiece holding area 360 for holding the workpiece as shown in FIG. 2 and FIG. 3. A fitting hole 361 that is open at the top is formed in the workpiece holding area 360 and an adsorption chuck 362 made of a porous material such as a porous ceramic or the like is fitted in the fitting hole 361. A circular suction groove 363 is formed in the center portion of the bottom of the above fitting hole 361 and an annular suction groove 364 is formed outside the suction groove 363. The suction grooves 363 and 364 are communicated to a suction means (not shown) by a suction path 365. The above workpiece holding area 360 has a shape similar to the workpiece and an outer periphery slightly (3 to 5 mm) smaller than that of the workpiece that will be described later. An annular buffer groove 366 is formed in such a manner that it surrounds the workpiece holding area 360 of the chuck table 36 having the workpiece holding area 360. This annular laser beam buffer groove 366 has a depth of 5 to 10 mm and a width of 20 to 30 mm. A laser beam absorbing member 367 made of alumite or the like for absorbing a laser beam is disposed at the bottom of the laser beam buffer groove 366. The thus constituted chuck table 36 places, for example, a disk-like semiconductor wafer as the workpiece on the workpiece holding area 360 and suction-holds it by activating the suction means that is not shown. The chuck table 36 is turned by a pulse motor (not shown) installed in the cylindrical member 34 shown in FIG. 1. The chuck table 36 in the illustrated embodiment has clamps 368 for fixing a dicing frame on which a dicing tape affixed to the semiconductor wafer as the workpiece is fixed.

Continuing a description with reference to FIG. 1, the above first sliding block 32 has, on its undersurface, a pair of to-be-guided grooves 321 and 321 to be fitted to the above pair of guide rails 31 and 31 and, on its top surface, a pair of guide rails 322 and 322 formed parallel to each other in the indexing-feed direction indicated by the arrow Y. The first sliding block 32 constituted as described above is constituted to be allowed to move in the processing-feed direction indicated by the arrow X along the pair of guide rails 31 and 31 by fitting the to-be-guided grooves 321 and 321 to the pair of guide rails 31 and 31, respectively. The chuck table mechanism 3 in the illustrated embodiment has a processing-feed means 37 for moving the first sliding block 32 along the pair of guide rails 31 and 31 in the processing-feed direction indicated by the arrow X. The processing-feed means 37 has a male screw rod 371 arranged between the above pair of guide rails 31 and 31 and in parallel thereto, and a drive source such as a pulse motor 372 or the like, for rotary-driving the male screw rod 371. The male screw rod 371 is, at its one end, rotatably supported to a bearing block 373 fixed on the above stationary base 2 and is, at the other end, transmission-coupled to the output shaft of the above pulse motor 372. The male screw rod 371 is screwed into a threaded through-hole formed in a female screw block (not shown) projecting from the undersurface of the center portion of the first sliding block 32. Therefore, by driving the male screw rod 371 in a normal direction or reverse direction with the pulse motor 372, the first sliding block 32 is moved along the guide rails 31 and 31 in the processing-feed direction indicated by the arrow X.

The above second sliding block 33 has, on its undersurface, a pair of to-be-guided grooves 331 and 331 to be fitted to the pair of guide rails 322 and 322 provided on the top surface of the above first sliding block 32 and is constituted to allowed to move in the indexing-feed direction indicated by the arrow Y by fitting the to-be-guided grooves 331 and 331 to the pair of guide rails 322 and 322, respectively. The chuck table mechanism 3 in the illustrated embodiment has a first indexing-feed means 38 for moving the second sliding block 33 in the indexing-feed direction indicated by the arrow Y along the pair of guide rails 322 and 322 provided on the first sliding block 32. The first indexing means 38 comprises a male screw rod 381, which is arranged between the above pair of guide rails 322 and 322 and in parallel thereto, and a drive source such as a pulse motor 382 for driving the male screw rod 381. The male screw rod 381 is, at its one end, rotatably supported to a bearing block 383 fixed on the top surface of the above first sliding block 32 and is, at the other end, transmission-coupled to the output shaft of the above pulse motor 382. The male screw rod 381 is screwed into a threaded through-hole formed in a female screw block (not shown) projecting from the undersurface of the center portion of the second sliding block 33. Therefore, by driving the male screw rod 381 in a normal direction or reverse direction with the pulse motor 382, the second sliding block 33 is moved along the guide rails 322 and 322 in the indexing-feed direction indicated by the arrow Y.

The above laser beam application unit support mechanism 4 comprises a pair of guide rails 41 and 41 which are mounted on the stationary base 2 and arranged parallel to each other in the indexing-feed direction indicated by the arrow Y, and a movable support base 42 mounted on the guide rails 41 and 41 in such a manner that it can move in the direction indicated by the arrow Y. This movable support base 42 comprises a movable support portion 421 movably mounted on the guide rails 41 and 41 and a mounting portion 422 mounted on the movable support portion 421. The mounting portion 422 is provided with a pair of guide rails 423 and 423 extending parallel to each other in the direction indicated by the arrow Z on one of its flanks. The laser beam application unit support mechanism 4 in the illustrated embodiment comprises a second indexing-feed means 43 for moving the movable support base 42 along the pair of guide rails 41 and 41 in the indexing-feed direction indicated by the arrow Y. This second indexing-feed means 43 comprises a male screw rod 431 arranged between the above pair of guide rails 41 and 41 in parallel thereto, and a drive source such as a pulse motor 432 for rotary-driving the male screw rod 431. The male screw rod 431 is, at its one end, rotatably supported to a bearing block (not shown) fixed on the above stationary base 2 and is, at the other end, transmission coupled to the output shaft of the above pulse motor 432. The male screw rod 431 is screwed into a threaded through-hole formed in a female screw block (not shown) projecting from the undersurface of the center portion of the movable support portion 421 constituting the movable support base 42. Therefore, by driving the male screw rod 431 in a normal direction or reverse direction with the pulse motor 432, the movable support base 42 is moved along the guide rails 41 and 41 in the indexing-feed direction indicated by the arrow Y.

The laser beam application unit 5 in the illustrated embodiment comprises a unit holder 51 and a laser beam application means 52 secured to the unit holder 51. The unit holder 51 has a pair of to-be-guided grooves 511 and 511 to be slidably fitted to the pair of guide rails 423 and 423 provided on the above mounting portion 422 and is supported in such a manner that it can move in the direction indicated by the arrow Z by fitting the guide grooves 511 and 511 to the above guide rails 423 and 423, respectively.

Figure 4:
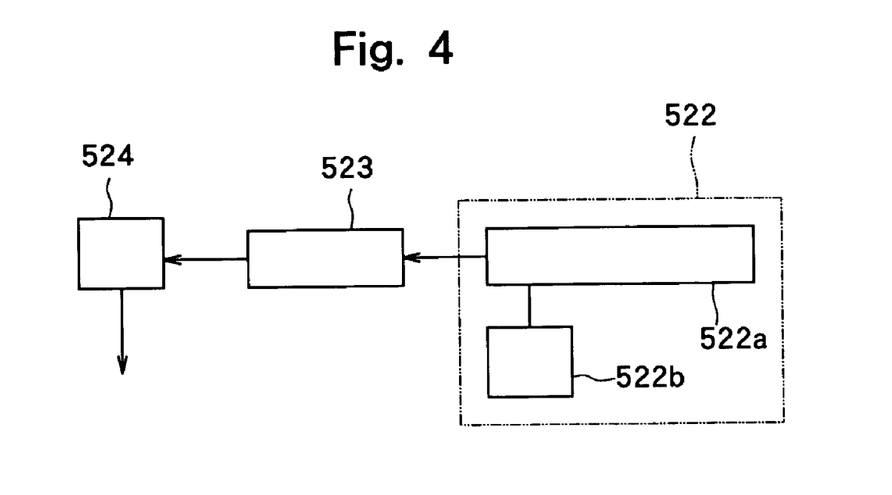
FIG. 4 is a block diagram showing the constitution of laser beam processing means in the laser beam processing machine shown in FIG. 1.

The illustrated laser beam application means 52 comprises a cylindrical casing 521 that is secured to the above unit holder 51 and extends substantially horizontally. In the casing 521, there are installed a pulse laser beam oscillation means 522 and a transmission optical system 523 as shown in FIG. 4. The pulse laser beam oscillation means 522 is constituted by a pulse laser beam oscillator 522a composed of a YAG laser oscillator or YVO4 laser oscillator and a repetition frequency setting means 522b connected to the pulse laser beam oscillator 522a. The transmission optical system 523 comprises suitable optical elements such as a beam splitter, etc. A condenser 524 housing condensing lenses (not shown) constituted by a set of lenses that may have a known formation is attached to the end of the above casing 521.

Figure 5:
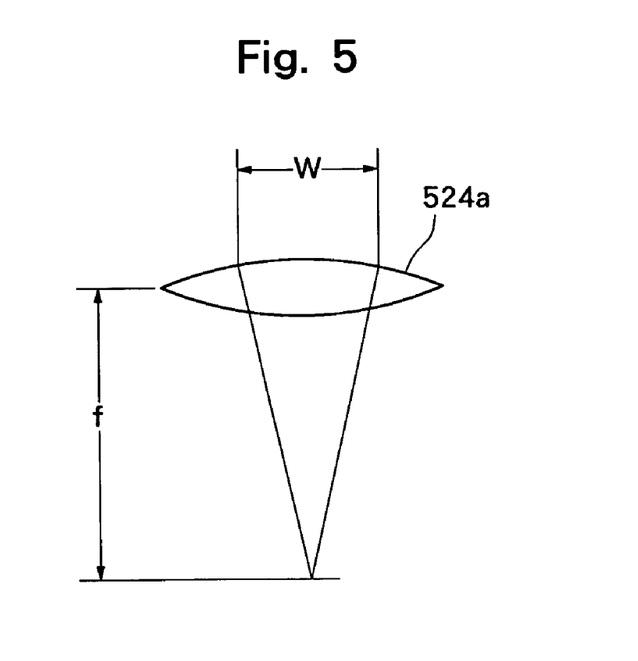
FIG. 5 is a schematic diagram for explaining the focusing spot diameter of a laser beam applied from the laser beam processing means shown in FIG. 4.

A laser beam oscillated from the above pulse laser beam oscillation means 522 reaches the condenser 524 through the transmission optical system 523 and is applied from the condenser 524 to the workpiece held on the above chuck table 36 at a predetermined focusing spot diameter D. This focusing spot diameter D is defined by the expression D ($\mu$m)=4×$\lambda$×f/($\pi$×W) ($\lambda$ is the wavelength ($\mu$m) of the pulse laser beam, W is the diameter (mm) of the pulse laser beam applied to an objective lens 524a, and f is the focusing distance (mm) of the objective lens 524a) when the pulse laser beam having a Gaussian distribution is applied through the objective lens 524a of the condenser 524, as shown in FIG. 5.

Returning to FIG. 1, an image pick-up means 6 for detecting the area to be processed by the above laser beam application means 52 is mounted to the front end of the casing 521 constituting the above laser beam application means 52. This image pick-up means 6 comprises an illuminating means for illuminating the workpiece, an optical system for capturing the area illuminated by the illuminating means, and an image pick-up device (CCD) for picking up an image captured by the optical system. An image signal is transmitted to a control means that is not shown.

The laser beam application unit 5 in the illustrated embodiment has a moving means 53 for moving the unit holder 51 along the pair of guide rails 423 and 423 in the direction indicated by the arrow Z. The moving means 53 comprises a male screw rod (not shown) arranged between the pair of guide rails 423 and 423 and a drive source such as a pulse motor 532 for rotary-driving the male screw rod. By driving the male screw rod (not shown) in a normal direction or reverse direction with the pulse motor 532, the unit holder 51 and the laser beam application means 52 are moved along the guide rails 423 and 423 in the direction indicated by the arrow Z. In the illustrated embodiment, the laser beam application means 52 is moved upward by driving the pulse motor 532 in a normal direction and moved downward by driving the pulse motor 532 in the reverse direction.

A description is subsequently given of a procedure of processing the workpiece by a laser beam using the above-described laser beam processing machine.

Figure 6:
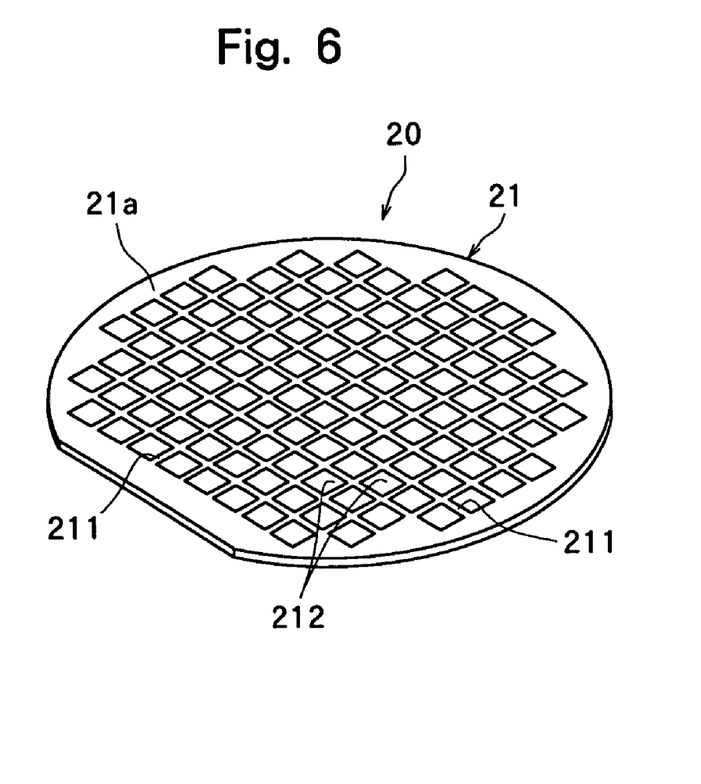
FIG. 6 is a perspective view of a semiconductor wafer as a workpiece.
Figure 7:
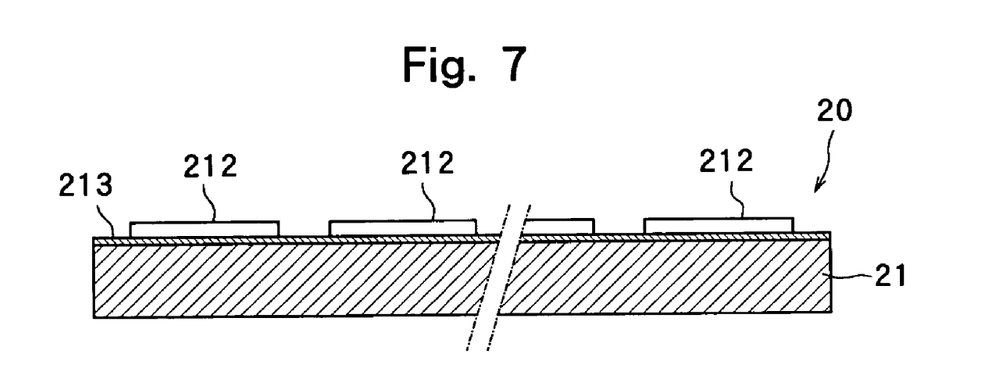
FIG. 7 is an enlarged sectional view of the semiconductor wafer shown in FIG. 6.

FIG. 6 is a perspective view of a semiconductor wafer as the workpiece to be processed by a laser beam, and FIG. 7 is an enlarged sectional view of dividing lines of the semiconductor wafer shown in FIG. 6. In the semiconductor wafer 20 shown in FIG. 6 and FIG. 7, a plurality of areas are sectioned by a plurality of dividing lines 211 formed in a lattice pattern on the front surface 21a of a semiconductor substrate 21 such as a silicon wafer, and a circuit 212 such as IC or LSI is formed in each of the areas sectioned. This semiconductor wafer 20 has a low-dielectric insulating film 213 laminated on the front surface of the semiconductor substrate 21.

Figure 8:
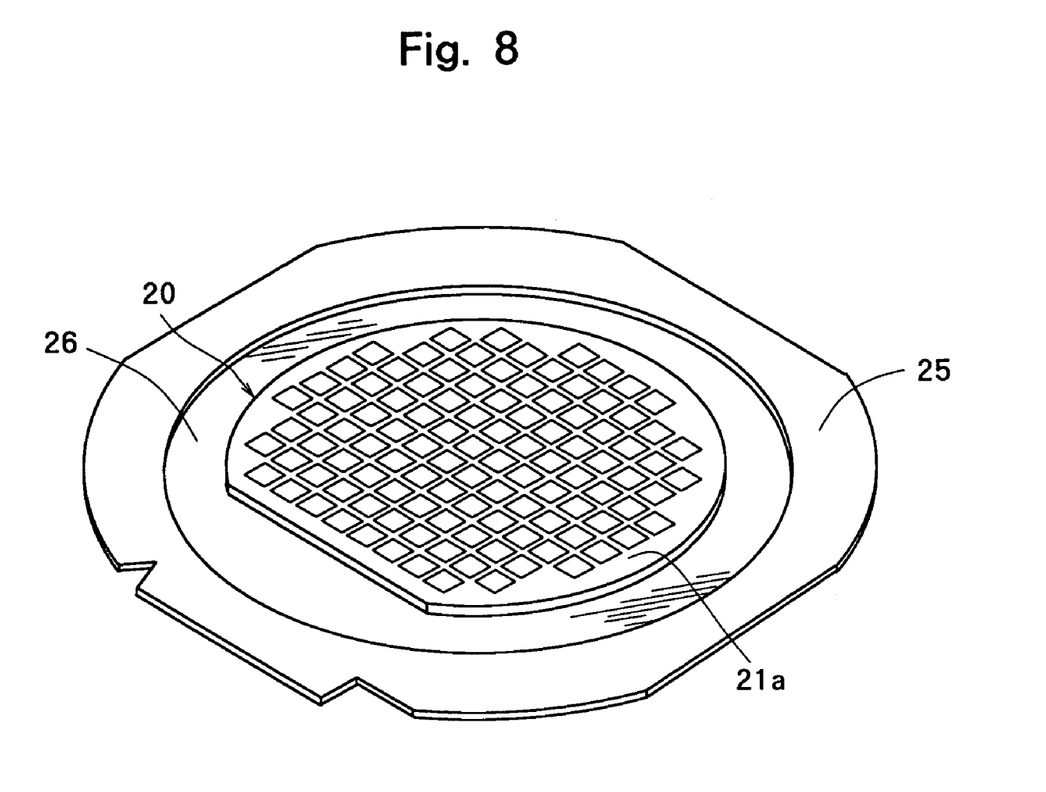
FIG. 8 is a perspective view showing a state where the semiconductor wafer shown in FIG. 6 has been put on a dicing tape affixed to an annular dicing frame.

The semiconductor wafer 20 constituted as described above is put on a dicing tape 26 composed of a synthetic resin sheet of vinyl chloride or the like affixed to an annular dicing frame 25 in such a manner that the front surface 21a faces up, as shown in FIG. 8.

The semiconductor wafer 20 supported to the dicing frame 25 through the dicing tape 26 is carried to the workpiece holding area 360 of the chuck table 36 constituting the chuck table mechanism 3 of the laser beam processing machine shown in FIG. 1 in such a manner that the front surface 21a faces up, and is placed on the workpiece holding area 360 via the dicing tape 26. The semiconductor wafer 20 is then suction-held on the workpiece holding area 360 by activating the suction means that is not shown. At this point, since the workpiece holding area 360 is similar in shape to the semiconductor wafer 20 and smaller in size than the semiconductor wafer 20 as described above, the peripheral portion of the semiconductor wafer 20 projects outward from the periphery of the workpiece holding area 360 and is situated above the annular buffer groove 366. The dicing frame 25 is fixed by the clamps 368 provided on the chuck table 36. The chuck table 36 suction-holding the semiconductor wafer 20 is moved along the guide rails 31 and 31 by the operation of the feed means 37 and is brought at the position right below the image pick-up means 6 mounted on the laser beam application unit 5.

After the chuck table 36 is positioned right below the image pick-up means 6, alignment work for detecting a processing area to be processed by a laser beam of the semiconductor wafer 20 is carried out by the image pick-up means 6 and the control means that is not shown. That is, the image pick-up means 6 and the control means (not shown) carry out image processing such as pattern matching etc., to align a dividing line 211 formed in a predetermined direction of the semiconductor wafer 20 with the condenser 524 of the laser beam application unit 5 for applying a laser beam along the dividing line 211, thereby performing the alignment of a laser beam application position. The alignment of the laser beam application position is also similarly carried out on dividing lines 211 formed on the semiconductor wafer 20 in a direction perpendicular to the above predetermined direction.

Figure 9:
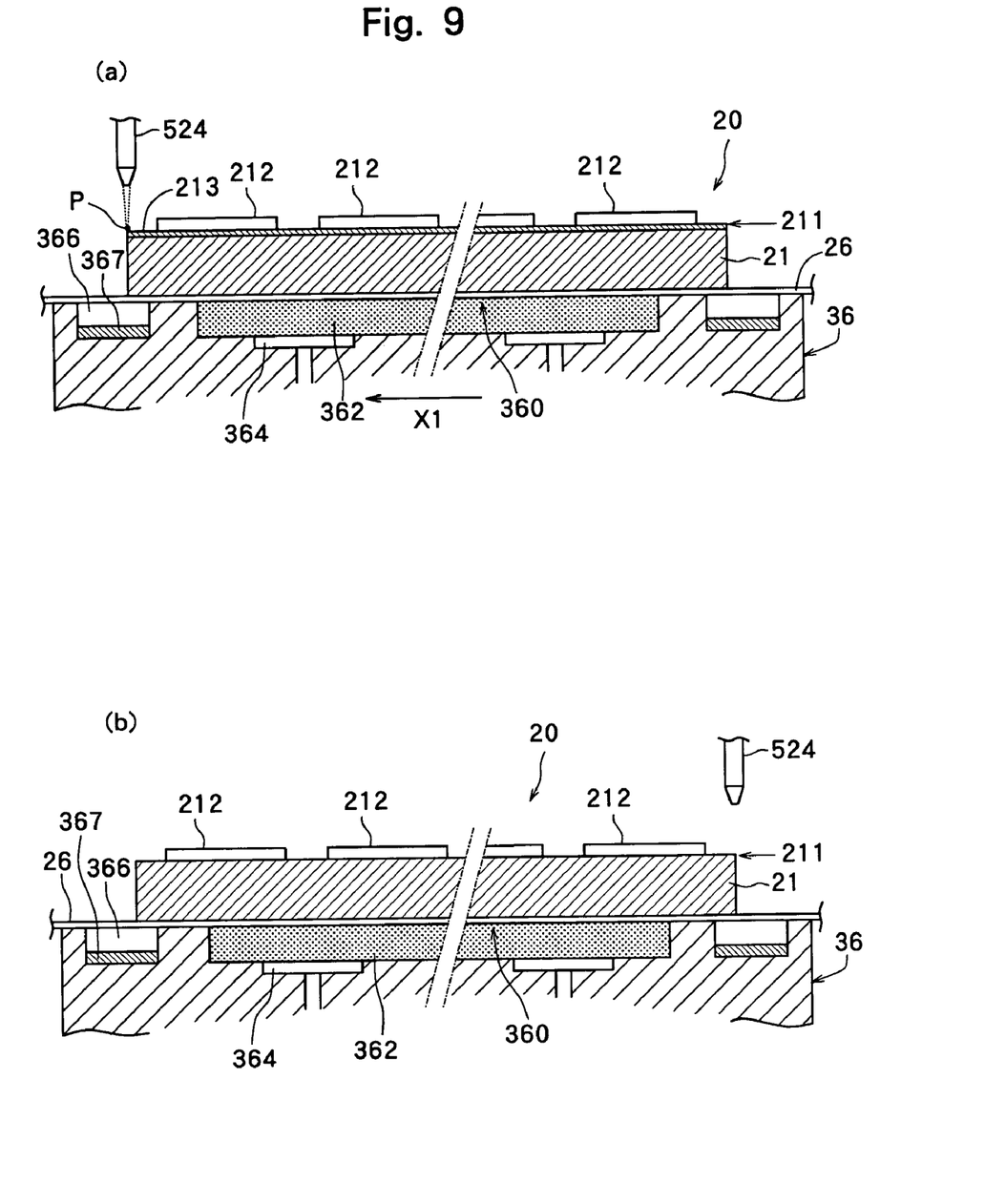
FIGS. 9(a) and 9(b) are diagrams explaining a laser beam application step carried out by the laser beam processing machine shown in FIG. 1.

After the dividing line 211 formed on the semiconductor wafer 20 held on the chuck table 36 is detected and the alignment of the laser beam application position is carried out, the chuck table 36 is moved to bring the predetermined dividing line 211 extending in the predetermined direction (horizontal direction in FIG. 9(a)) to a position right below the condenser 524 of the laser beam application means 52. Further, one end (left end in FIG. 9(a)) of the dividing line 211 is positioned right below the condenser 524, as shown in FIG. 9(a). Then, the chuck table 36 is moved in the processing-feed direction indicated by the arrow X1 at a predetermined feed rate while a laser beam is applied from the condenser 524 of the laser beam application means 52 to the low-dielectric insulating film 213 formed on the dividing line 211. At this point, the focusing point P of the laser beam applied from the condenser 524 is set to the surface of the low-dielectric insulating film 213. When the application position of the condenser 524 reaches the other end (right end in FIG. 9(b)) of the dividing line 211 as shown in FIG. 9(b), the application of the laser beam is suspended. As a result, the low-dielectric insulating film 213 formed on the dividing line 211 is removed (laser beam application step).

Figure 10:
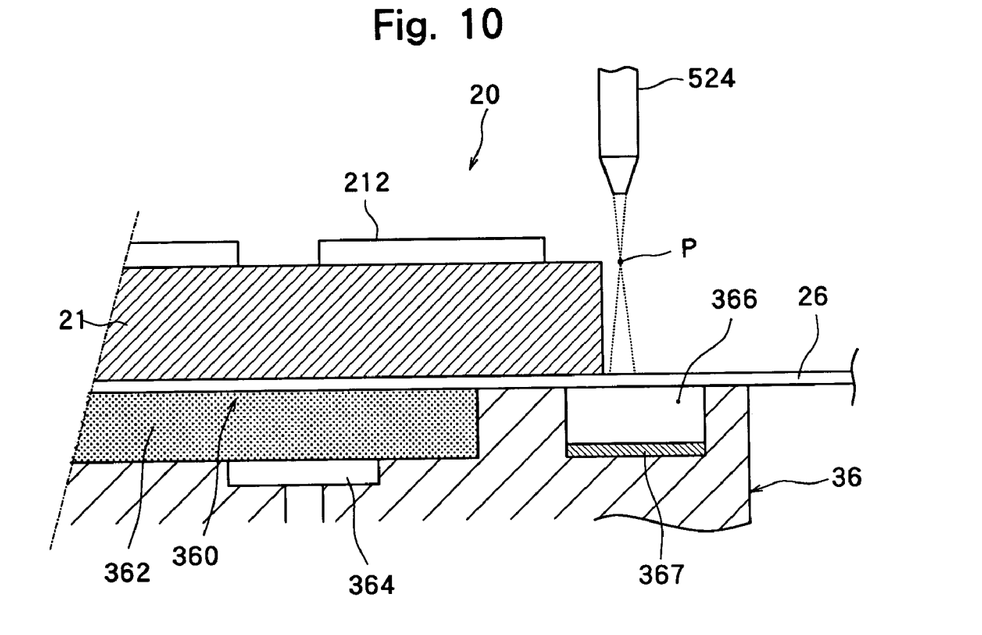
FIG. 10 is a diagram showing an embodiment of the present invention in which a laser beam overruns the workpiece in the laser beam application step shown in FIGS. 9(a) and 9(b) and FIG. 11 is a diagram showing another embodiment of the present invention in which a laser beam overruns the workpiece in the laser beam application step shown in FIGS. 9(a) and 9(b).
Figure 11:
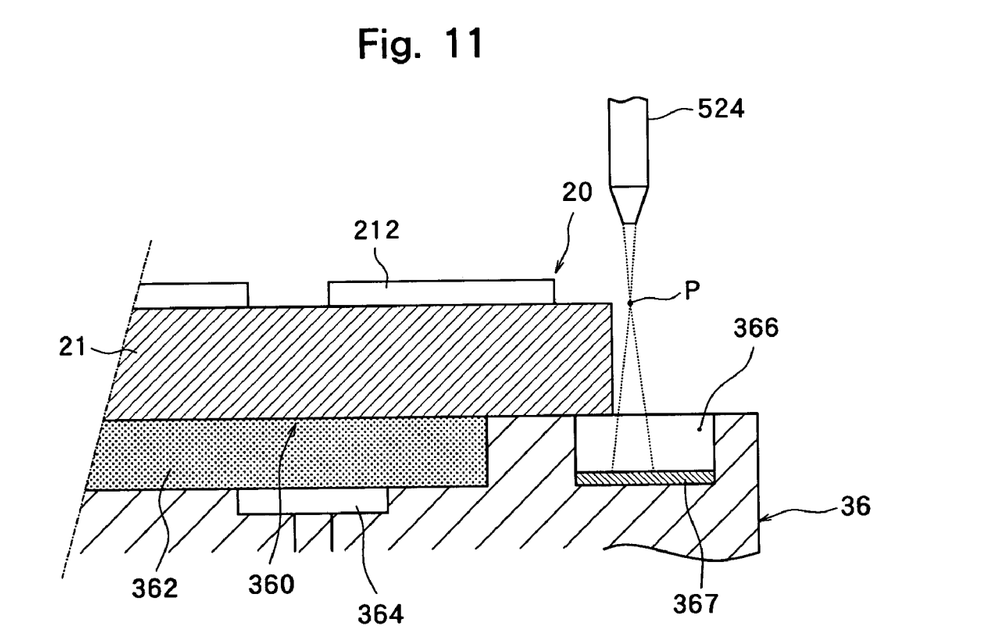

In the above laser beam application step, a laser beam applied from the condenser 524 of the laser beam application means 52 may overrun the semiconductor wafer 20 as shown in FIG. 10 due to a reaction time lag or in error. At this time, although the laser beam is applied to the dicing tape 26 and the dicing tape 26 is molten by heating, as no workpiece holding area 361 of the chuck table 36 exists in the area where the laser beam is applied to the dicing tape 26, the molten dicing tape does not adhere to the workpiece holding area 360. As shown in FIG. 11, when the semiconductor wafer 20 as the workpiece is not put on the dicing tape but held on the workpiece holding area 360 of the chuck table 36 directly, if a laser beam applied from the condenser 524 of the laser beam application means 52 in the above laser beam application step overruns the semiconductor wafer 20, the laser beam will be applied to the laser beam buffer groove 366 of the chuck table 36 directly. Since the bottom of the laser beam buffer groove 366 is fully far from the focusing point P of the laser beam and the laser beam diffuses, the energy density is not high enough to process the laser beam buffer groove 366 and therefore, the chuck table 36 is not damaged. Since the laser beam adsorbing member 367 is disposed at the bottom of the laser beam buffer groove 366 in the illustrated embodiment, the damage of the chuck table 36 can be prevented without fail.

The processing conditions in the above laser beam application step are set as follows in the illustrated embodiment.

Light source: YAG laser or YVO4 pulse laser
Wavelength: 355 nm
Output: 0.5 W
Repetition frequency: 50 kHz
Pulse width: 10 ns
Focusing spot diameter: 9.2 µm
Processing feed rate: 100 mm/sec After the laser beam application step is carried out on predetermined dividing line 211 as shown in FIG. 9(a), the chuck table 36 is moved in the indexing-feed direction perpendicular to the dividing line 211 by the distance between dividing lines to carry out the above laser beam application step. This indexing-feed step and the laser beam application step are carried out repeatedly to remove the low-dielectric insulating film 213 formed on all of the dividing lines 211 extending in the predetermined direction of the semiconductor wafer 20. After the laser beam application step is carried out on the dividing lines 211 extending in the predetermined direction of the semiconductor wafer 20 as described above, the chuck table 36, that is, the semiconductor wafer 20 is turned at 90° to carry out the above laser beam application step on dividing lines 211 extending in a direction perpendicular to the dividing lines 211 extending in the above predetermined direction. As a result, the low-dielectric insulating film 213 formed on all of the dividing lines 211 of the semiconductor wafer 20 is removed.

After the low-dielectric insulating film 213 formed on all of the dividing lines 211 of the semiconductor wafer 20 is removed as described above, the chuck table 36 holding the semiconductor wafer 20 is returned to the position where it first suction-held the semiconductor wafer 20 to cancel the suction-holding of the semiconductor wafer 20. The semiconductor wafer 20 is then carried to the dicing step by a conveying means that is not shown. In this dicing step, the semiconductor wafer 20 is cut with a cutting machine having a cutting blade along the dividing lines 211 to be divided into individual semiconductor chips. Since the low-dielectric insulating film 213 has been removed from the dividing lines 11, the peeling-off of the low-dielectric insulating film, which occurs when the low-dielectric insulating film is cut with the blade, can be prevented.

While an embodiment in which laser processing for removing the low-dielectric insulating film formed on the dividing lines of the semiconductor wafer is carried out has been described above, the laser beam processing machine of the present invention can be used for laser processing for forming a continuous deteriorated layer in the inside of the semiconductor wafer by applying a pulse laser beam of a wavelength of 1,054 nm, that is capable of passing through the semiconductor wafer, to the semiconductor wafer along the dividing lines of the semiconductor wafer.

What is claimed is:

1. A chuck table for chucking a semiconductor wafer thereon in a machine for cutting semiconductor wafers along dividing lines by a laser beam, wherein said chuck table has thereon a surface with a workpiece holding area for holding a semiconductor wafer, said workpiece holding area having a shape similar to the semiconductor wafer but having a size smaller than a held semiconductor wafer;

wherein said chuck table has an annular buffer groove formed in said surface to have a bottom recessed from said surface, said buffer groove surrounding the perimeter of said workpiece holding area so that the held semiconductor wafer projects outward from the periphery of said workpiece holding area to above said annular buffer groove; and wherein said buffer groove has a laser beam adsorbing member disposed on said bottom thereof, said adsorbing member having a property of absorbing the laser beam.

2. The chuck table for chucking a semiconductor wafer according to claim 1, wherein said width of the buffer groove is 20 to 30 mm.

3. The chuck table for chucking a semiconductor wafer according to claim 2, wherein the buffer groove has a depth of 5 to 10 mm.

* * * * *